United States Patent
Numajiri (10) Patent No.: US 8,480,369 B2
(45) Date of Patent: Jul. 9, 2013

(54) ROTOR HEAD OF WIND POWER GENERATOR AND WIND POWER GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 749 days.

(21) Appl. No.: 12/520,594

(22) PCT Filed: Dec. 19, 2008

(86) PCT No.: PCT/JP2008/073233
§ 371 (c)(1),
(2), (4) Date: Jun. 22, 2009

(87) PCT Pub. No.: WO2010/070767
PCT Pub. Date: Jun. 24, 2010

(65) Prior Publication Data
US 2010/0316499 A1 Dec. 16, 2010

(51) Int. Cl.
*F03D 11/04* (2006.01)
(52) U.S. Cl.
USPC .................................. 416/214 A; 416/244 A
(58) Field of Classification Search
USPC ................. 290/44; 416/214 A, 244 A, 244 B, 416/244 R, 245 A, 245 R, DIG. 6, 214 R, 416/219 R, 222, 248
See application file for complete search history.

(56) References Cited

U.S. PATENT DOCUMENTS

| | | | |
|---|---|---|---|
| 3,308,889 A * | 3/1967 | Langhjelm et al. | 416/140 |
| 3,403,735 A * | 10/1968 | Langhjelm et al. | 416/140 |
| 4,304,524 A * | 12/1981 | Coxon | 416/131 |
| 4,352,633 A * | 10/1982 | Tassen | 416/137 |
| 6,506,019 B2 * | 1/2003 | Lin et al. | 416/93 A |
| 6,942,461 B2 | 9/2005 | Wobben | |

FOREIGN PATENT DOCUMENTS

| | | |
|---|---|---|
| EP | 1882854 | 1/2008 |
| JP | 55-149497 U | 10/1980 |
| JP | 56-39992 A | 4/1981 |
| JP | 8-35482 A | 2/1996 |
| JP | 9-41454 A | 2/1997 |
| JP | 11-192580 A | 7/1999 |
| JP | 2004-504534 A | 2/2004 |
| JP | 2004504534 A | 2/2004 |
| KR | 1019840000541 B | 8/1983 |
| WO | 0142647 A2 | 6/2001 |

OTHER PUBLICATIONS

International Search Report of corresponding Application No. PCT/JP2008/073233 mailed Jan. 27, 2009.
CN Office Action for 200880002326.0, issued Aug. 26, 2011.

(Continued)

*Primary Examiner* — Edward Look
*Assistant Examiner* — Jason Davis
(74) *Attorney, Agent, or Firm* — Kanesaka Berner & Partners, LLP (57) ABSTRACT

A pitch drive device of a wind power generator capable of preventing the loss of reliability of the pitch drive device with a simple structure and a wind power generator are provided. A rotor head of a wind power generator in which a plurality of wind turbine blades are radially attached around a rotation axis is formed by joining a plurality of separately formed front rotor head and rear rotor head, and joint portions of the front rotor head and the rear rotor head are formed in a plane intersecting the rotation axis.

8 Claims, 5 Drawing Sheets

OTHER PUBLICATIONS

Search Report issued Mar. 14, 2011 from Canadian Patent Application No. 2,669,911.
Decision to Grant a Patent issued for CN200880002326.0, with a Partial English Translation, date of issue: Jun. 26, 2012.
Decision to Grant a Patent issued for KR10-2009-7014307, with a Partial English Translation, date of issue: Apr. 30, 2012.
A Decision to Grant in corresponding Japanese Patent Application No. 2009-525812 which issued on Jan. 29, 2013.

* cited by examiner

FIG. 7

ROTOR HEAD OF WIND POWER GENERATOR AND WIND POWER GENERATOR

CROSS-REFERENCE TO RELATED APPLICATIONS

The present application is based on International Application No. PCT/JP2008/073233, filed on Dec. 19, 2008, and priority is hereby claimed under 35 USC §119 based on this application. This application is hereby incorporated by reference in its entirety into the present application.

TECHNICAL FIELD

The present invention relates to a rotor head of a wind power generator and to a wind power generator.

BACKGROUND ART

A wind turbine of a wind power generator includes a nacelle disposed substantially horizontally on the top of a tower so as to be rotatable, a rotor head mounted on the nacelle so as to be rotatable about a substantially horizontal axis, and a plurality of (for example, three) wind turbine blades radially attached around the axis of the rotor head.

The force of the wind blowing in the axis direction of the rotor head against the wind turbine blades is converted into motive power for rotating the rotor head about the axis.

In general, in view of strength, the rotor head is composed of a cast metal (cast iron or cast steel) and is formed as a single component. In recent years, as the size of wind turbines has increased, the size and weight of the rotor heads have increased. For example, the rotor head of a wind power generator of 2 to 3 MW class weighs about 10 t. It is expected that the rotor heads of future wind power generators of 5 MW class will weigh more than 40 t.

An increase in the size of the rotor head may make it difficult or impossible to mold it as a single component from a cast metal. It also requires great effort and costs to transport the rotor head to an erection site.

Thus, there is a strong demand for a structure that can cope with an increase in the size of the rotor head.

For example, as disclosed in Patent Document 1, a rotor head that is formed as segments and is assembled at an erection site is proposed.

The rotor head is formed by joining a central core portion and three outer portions to which wind turbine blades are to be attached.

Because this enables the core portion and the outer portions having a reliable size to be formed from a cast metal, they can be produced with high quality. This also makes transportation easier because small segments are transported.

Patent Document 1:
Japanese Translation of PCT International Application, Publication No. 2004-504534

DISCLOSURE OF INVENTION

In the rotor head disclosed in Patent Document 1, joint parts of the core portion and the outer portions are provided around the entire circumference along attaching surfaces of the wind turbine blades. Therefore, because the whole load acting on the wind turbine blades is applied to the joint portions of the segments, the joint portions need to be strong joint structures.

In general, because joint structures have smaller strength than integral structures, those subjected to a great load have a problem with long-term reliability.

Because the core portion has openings to which the outer portions are joined, small saddle portions are left between the openings. When the core portion is produced from a cast metal, the molten metal flows into the saddle portions. Therefore, a cross-sectional area large enough for the molten metal to sufficiently flow is necessary. This limits size reduction of the core portion. That is, the saddle portion areas existing in the middle of the flow path of the molten metal have to be large enough to maintain the precision and quality of casting, which makes it difficult to reduce the size of the core portion easily.

The present invention has been made in view of the above-described problem, and an object thereof is to provide a rotor head of a wind power generator and a wind power generator that can cope with an increase in the size and prevent the loss of reliability thereof.

To achieve the above-described object, the present invention provides the following solutions.

A first aspect of the present invention is a rotor head of a wind power generator in which a plurality of wind turbine blades are radially attached around an axis. The rotor head of a wind power generator is formed by joining a plurality of separately formed segments. At least one of the joint parts of the segments is formed in a plane intersecting the axis.

According to this aspect, because the rotor head is formed by joining a plurality of segments, the respective segments can be formed in a reliable size from cast metal. Therefore, the rotor head can be assuredly produced even if it becomes large. Furthermore, because the segments are individually transported to a construction site, they can be easily transported.

Because at least one of the joint parts of the segments is formed in a plane intersecting the axis of the rotor head, this segment surface is formed in a direction intersecting the wind direction. Because wind blowing against the wind turbine blades bends the wind turbine blades toward the leeward side, the bending load acting on attaching surfaces of the wind turbine blades is large on the windward side and the leeward side and decreases in the direction intersecting the wind direction. Accordingly, because the joint parts of the segments are provided at portions where the bending load is small, the reliability of the joint structure can be increased.

Furthermore, because the joint parts are formed so as to separate portions between wind-turbine-blade attaching openings, these parts may be used as the entrance or exit holes of the molten metal when the segments are produced from cast metal. As a result, the molten metal does not need to flow in the saddle portions between the attaching openings. Thus, the cross-sectional area, i.e., the width between the openings, can be reduced. If the saddle portions between the openings can be made small, the rotor head can be made small.

In the above-described aspect, it is preferable that the number of segments be two, and that the joint parts be formed in a plane passing through axial centers of the wind turbine blades.

Thus, because the joint parts are formed only in the plane passing through the axial centers of the wind turbine blades, in other words, the plane that is substantially perpendicular to the axis of the rotor head, they are joined at portions where the load is smallest.

In the above-described structure, it is preferable that the joint parts be provided with a positioning member that determines mutual joint positions.

This enables the joint position to be determined by the positioning member, and the machining of the cast metal, for example, the machining of the attaching surface of the slew ring, to be performed in accordance therewith.

A second aspect of the present invention is a wind power generator including a plurality of wind turbine blades that receive wind power, the rotor head according to the first aspect, and a power generating unit that generates power by the rotation of the rotor head.

According to this aspect, because the use of the rotor head according to the first aspect makes it possible to cope with an increase in the size of the rotor head without losing the reliability, it is possible to cope with an increase in the size of the wind power generator.

According to the present invention, because the rotor head is formed by joining a plurality of segments, the rotor head can be assuredly produced even if it becomes large. Furthermore, because the segments are individually transported to a construction site, they can be easily transported.

Because at least one of the joint parts of the segments is formed in a plane intersecting the axis of the rotor head, the reliability of the joint structure can be increased.

Furthermore, because the joint parts are formed so as to separate portions between wind-turbine-blade attaching openings, the saddle portions between the openings can be made compact, and thus, the rotor head can be made compact.

EXPLANATION OF REFERENCE SIGNS

1: wind power generator
4: rotor head
6: wind turbine blades
7: power generating unit
13: front rotor head
14: rear rotor head
16: joint portion
18: reamer bores
19: reamer pins
L: rotation axis
O, OA, OB, OC: center of axis

BEST MODE FOR CARRYING OUT THE INVENTION

A wind power generator 1 according to an embodiment of the present invention will be described with reference to FIGS. 1 to 7.

Figure 1:
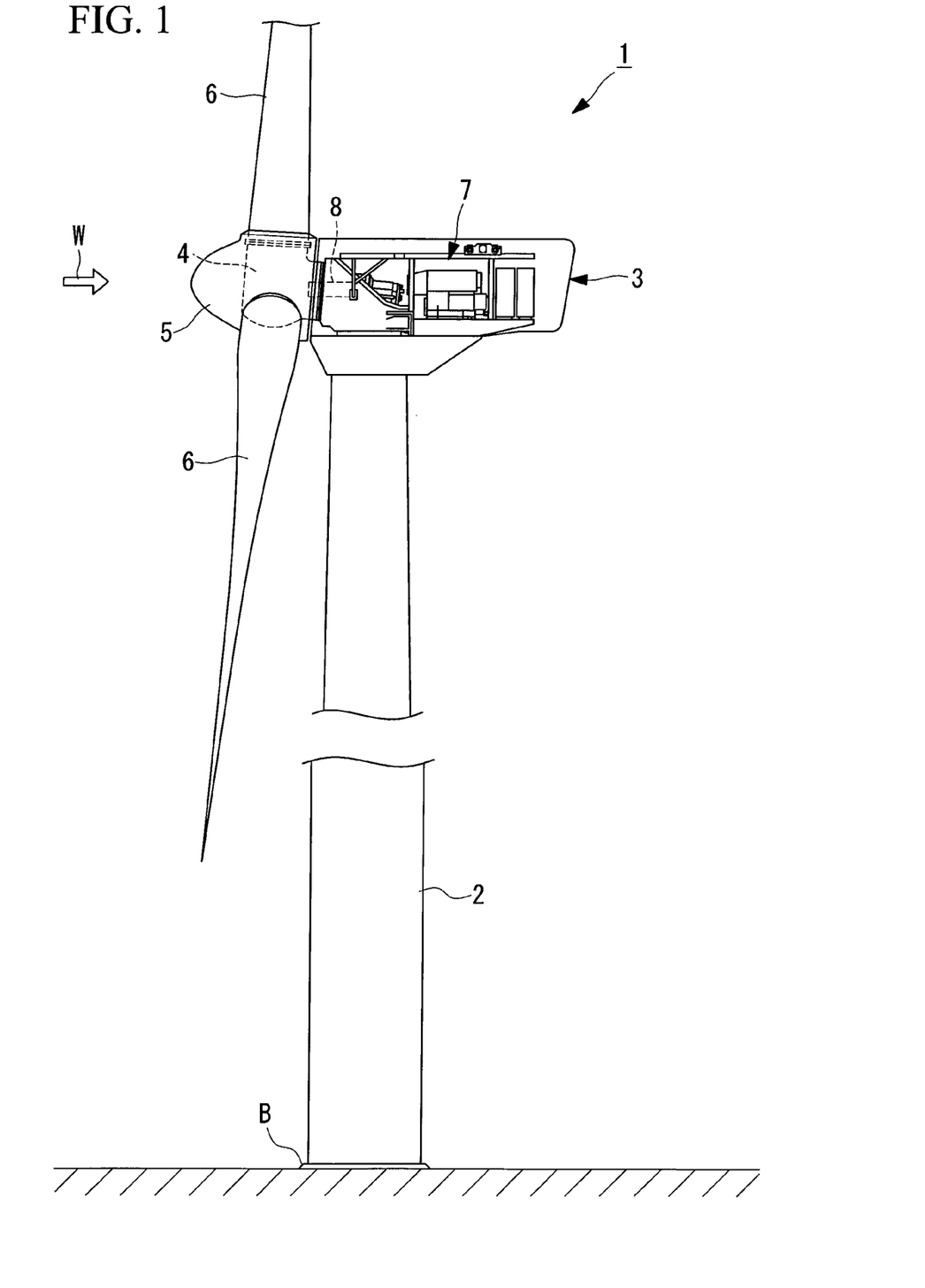
FIG. 1 is a side view showing the schematic structure of an entire wind power generator according to an embodiment of the present invention.

FIG. 1 is a side view showing the schematic structure of the entirety of the wind power generator 1 according to this embodiment.

The wind power generator 1 includes a tower 2 installed upright on a foundation B, a nacelle 3 mounted on the top of the tower 2, a rotor head 4 mounted to the nacelle 3 so as to be rotatable about a substantially horizontal axis, a head capsule 5 for covering the rotor head 4, a plurality of wind turbine blades 6 radially attached around a rotation axis (axis) L of the rotor head 4, and a power generating unit 7 for generating power by rotation of the rotor head 4.

As shown in FIG. 1, the tower 2 has a columnar structure extending upward (upward in FIG. 1) from the foundation B, and has a structure in which, for example, a plurality of units are connected in the vertical direction.

The nacelle 3 is mounted on the top of the tower 2. When the tower 2 consists of a plurality of units, the nacelle 3 is mounted on the top unit.

As shown in FIG. 1, the nacelle 3 rotatably supports the rotor head 4 with a main shaft 8 and accommodates the power generating unit 7 for generating power by rotation of the rotor head 4 (that is, the main shaft 8).

An example of the power generating unit 7 is one having a gearbox for increasing the rotational speed of the main shaft 8, a generator to which the rotational driving force of the rotor head 4 is transmitted so that power is generated, and a transformer for converting a voltage generated by the generator into a predetermined voltage.

Figure 2:
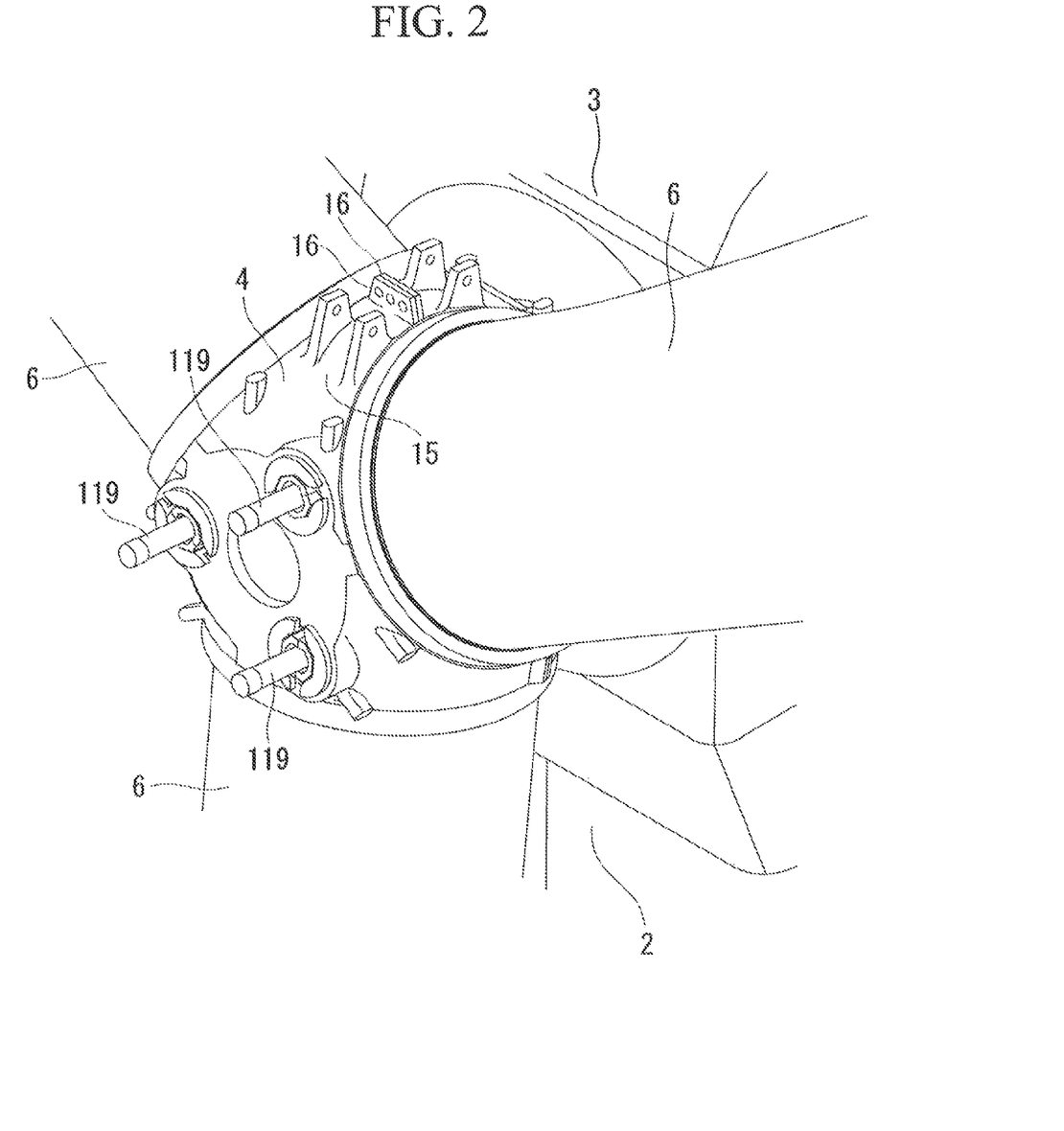
FIG. 2 is a partial enlarged view showing the structure of a rotor head in FIG. 1.
Figure 3:
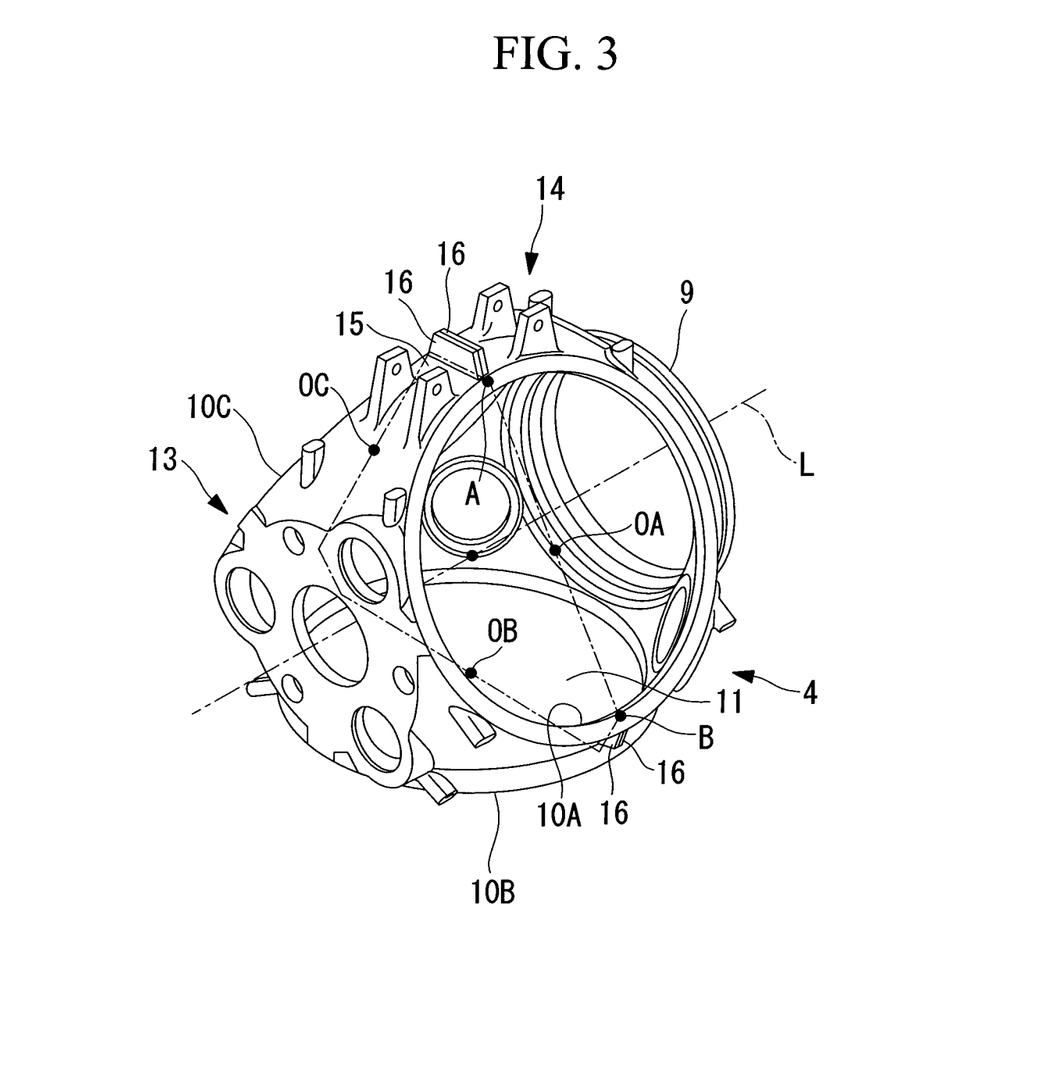
FIG. 3 is a perspective view showing the structure of the rotor head according to an embodiment of the present invention.

FIG. 2 is a partial enlarged view showing the structure of the rotor head in FIG. 1. FIG. 3 is a perspective view showing the rotor head 4 in isolation.

The plurality of wind turbine blades 6 are attached to the rotor head 4 radially around the rotation axis L, and the periphery of the rotor head 4 is covered by the head capsule 5.

Thus, when the wind strikes the wind turbine blades 6 from the rotation axis L direction of the rotor head 4, the wind turbine blades 6 generate force to rotate the rotor head 4 about the rotation axis L, thus rotationally driving the rotor head 4.

Although this embodiment is described as applied to an example in which three wind turbine blades 6 are provided, the number of the wind turbine blades 6 is not limited to three, but may be two or more than three; it is not specifically limited.

The rotor head 4 has a main-shaft mounting portion 9 to which the main shaft 8 is to be mounted and wind-turbine-blade attaching portions 10, which are substantially circular openings, to which the wind turbine blades 6 are to be attached.

The rotor head 4 is substantially in the shape of an equilateral triangle with concaved corners as viewed in the rotation axis L direction, i.e., a wind direction W. As shown in FIG. 3, the wind-turbine-blade attaching portions 10A, 10B, and 10C having a substantially circular shape are provided at positions corresponding to the sides of the equilateral triangle.

The rotor head 4 consists of a front rotor head (segment) 13 and a rear rotor head (segment) 14 divided into two at a plane 11 connecting the axial centers OA, OB, and OC of the wind-turbine-blade attaching portions 10A, 10B, and 10C.

The plane 11 is substantially perpendicular to the rotation axis L of the rotor head 4.

Concave saddle portions 15 between the wind-turbine-blade attaching portions 10A, 10B, and 10C in the front rotor head 13 and the rear rotor head 14 are provided with joint portions (joint parts) 16.

Figure 5:
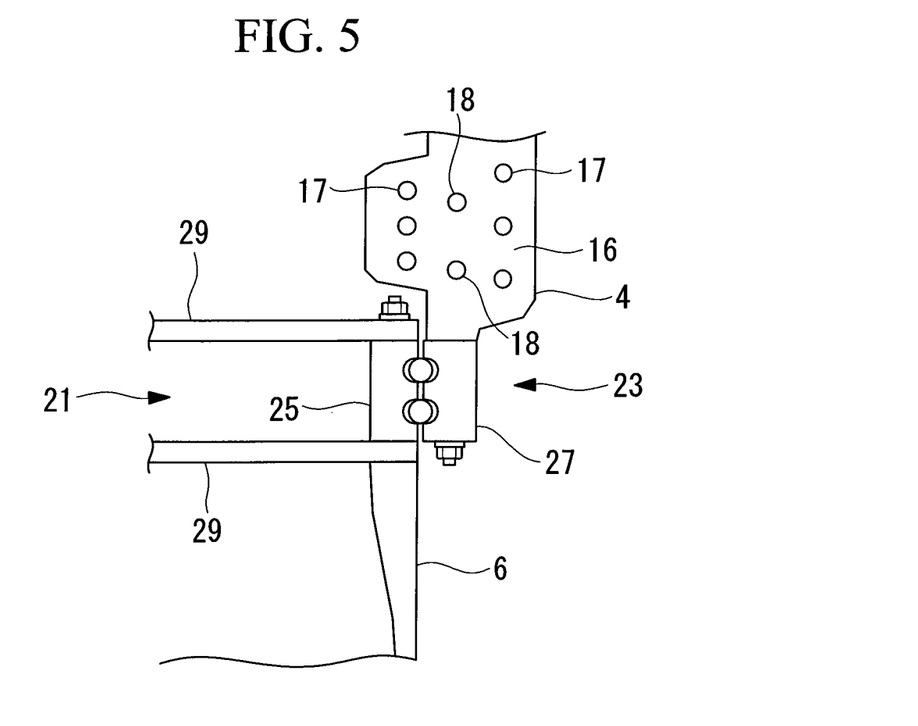
FIG. 5 is a partial sectional view showing the structure of a joint portion according to an embodiment of the present invention.

As shown in FIGS. 3 and 5, the joint portions 16 are provided so as to project outward and inward in the thickness direction. As shown in FIG. 5, projections of the joint portions 16 have a plurality of (for example, three) through holes 17 through which bolts are to be inserted.

Main parts of the joint portions 16 have a plurality of (for example, two) positioning reamer bores (positioning members) 18.

Figure 6:
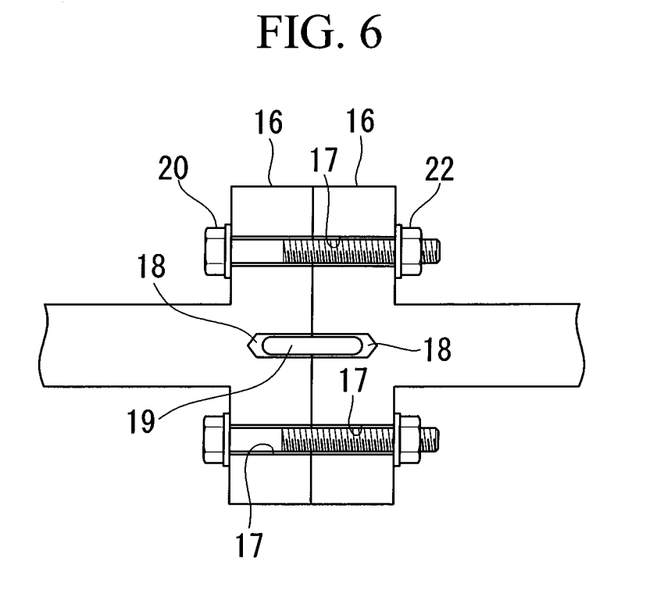
FIG. 6 is a partial sectional view showing the joint portion according to an embodiment of the present invention in a joined state.

As shown in FIG. 6, the front rotor head 13 and the rear rotor head 14 are positioned by reamer pins (positioning members) 19 inserted into the reamer bores 18 in the joint portions 16 and are joined together by bolts 20 inserted into the bolt holes 17 and nuts 22.

The bolt holes 17 may be threaded so that the bolts 20 join them without using the nuts 22.

Thus, because the rotor head 4 is formed by joining the front rotor head 13 and the rear rotor head 14, the front rotor head 13 and the rear rotor head 14 having a reliable size can be formed from a cast metal.

This ensures that the rotor head 4 can be produced even if the size thereof is increased. Furthermore, because the front rotor head 13 and the rear rotor head 14 can be individually transported to an erection site, they can be easily transported.

The wind turbine blades 6 each have, on the blade root side, a base 21 supported on the rotor head 4 by a slew ring bearing 23 so as to be rotatable. The slew ring bearing 23 consists of two rows of roller bearings.

The base 21 is formed of a pair of substantially circular top plates 29 that hold both ends of an inner ring 25 of the slew ring bearing 23 therebetween.

An outer ring 27 of the slew ring bearing 23 is fixed to the rotor head 4 with bolts.

Because the wind turbine blades 6 are each fixed to the top plate 29 on the outer circumference side (the lower side in FIG. 5), the entire wind turbine blade 6 is supported so as to be rotatable relative to the rotor head 4.

The rotor head 4 is provided, in one-to-one correspondence with the wind turbine blades 6, with pitch drive devices 119 for rotating the wind turbine blades 6 about the axial centers O of the wind turbine blades 6 to change the pitch angle of the wind turbines blades 6 (refer to FIG. 2).

An overview of a method for generating power using the wind power generator 1 having the above-described structure will be described next.

In the wind power generator 1, the force of the wind blowing in the rotation axis L direction of the rotor head 4 against the wind turbine blades 6 is converted into motive power for rotating the rotor head 4 about the rotation axis.

The rotation of the rotor head 4 is transmitted through the main shaft 8 to the power generating unit 7, where electric power suitable for an object to be supplied with electric power, for example, alternating-current power having a frequency of 50 Hz or 60 Hz, is generated.

At least during power generation, to allow the force of the wind to effectively act on the wind turbine blades 6, the nacelle 3 is appropriately rotated in the horizontal plane to make the rotor head 4 face the wind.

Figure 4:
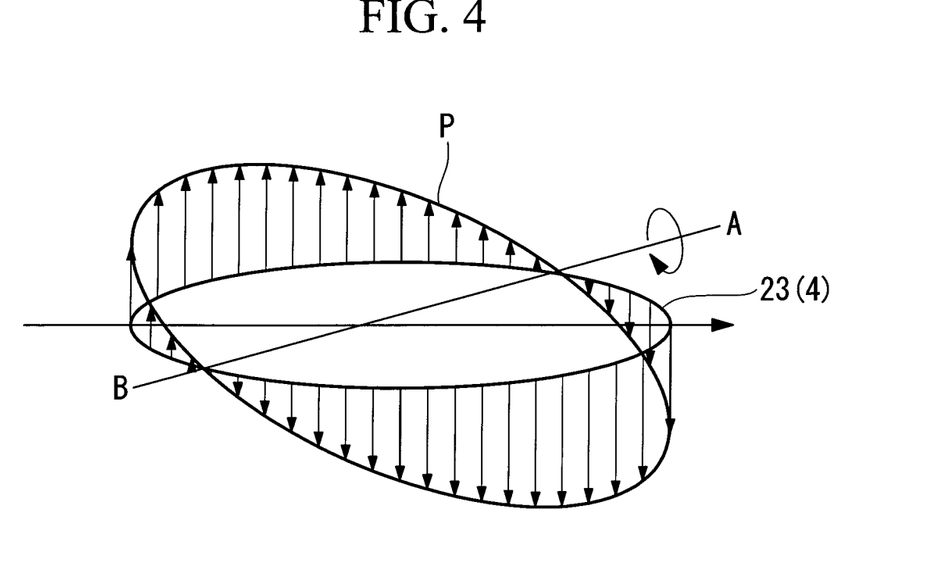
FIG. 4 is a schematic diagram showing the load distribution at a slew ring of the rotor head according to an embodiment of the present invention.

At this time, because wind blowing against the wind turbine blades 6 bends the wind turbine blades 6 toward the leeward side, a bending load acts on the slew rings 23 by which the wind turbine blades 6 are attached to the rotor head 4. FIG. 4 shows the load distribution P acting on the slew ring (inner ring 25) at a wind-turbine-blade attaching portion 10A. The plane 11 passes through the axial center OA of the wind-turbine-blade attaching portion 10A and is substantially perpendicular to the axial center L, i.e., the wind direction W. The intersections of the plane 11 and the wind-turbine-blade attaching portion 10A are denoted by points A and B.

When the wind turbine blade 6 receives a bending moment due to the wind, the bending load acting on the slew ring (inner ring 25) is large on the windward side and the leeward side and decreases in the direction intersecting the wind direction. Therefore, it is minimum at points A and B on the plane 11. In other words, it is symmetric with respect to the points A and B on the plane 11, these portions are neutral positions of the bending load. Although these neutral positions slightly fluctuate due to changes in wind conditions, the points A and B are generally neutral positions.

Thus, because the joint portions 16 are provided at portions where the bending load is minimum, no great load acts on the joint portions 16. Therefore, even a structure joined with the bolts 20 and the nuts 22 has sufficient long-term reliability in terms of strength.

Even if the plane 11 passes through the axial centers OA, OB, and OC and intersects the rotation axis L, substantially the same loading conditions can be obtained. The plane 11 may intersect the rotation axis L without passing through the axial centers OA, OB, and OC.

A method for manufacturing the rotor head 4 will be described below.

The front rotor head 13 and the rear rotor head 14 are each formed by casting. At this time, molds of the front rotor head 13 and the rear rotor head 14 are formed such that the joint portions 16 are positioned on the top, and molten metal is injected from the bottom to allow excess scum to be ejected from the joint portions 16.

Thus, because the joint portions 16 are formed at the saddle portions 15 between the wind-turbine-blade attaching portions 10A, 10B, and 10C, the joint portions 16, for example, may serve as exit holes of the molten metal. If the molten metal does not need to flow down into the saddle portions 15, the minimum cross-sectional area needed for the molten metal to flow does not have to be maintained. Therefore, the cross-sectional area of the saddle portions 15, i.e., the width of the saddle portions 15, can be reduced independently of the cross-sectional area needed for the molten metal to flow.

In other words, the wind-turbine-blade attaching portions 10A, 10B, and 10C can be provided close to each other.

Figure 7:
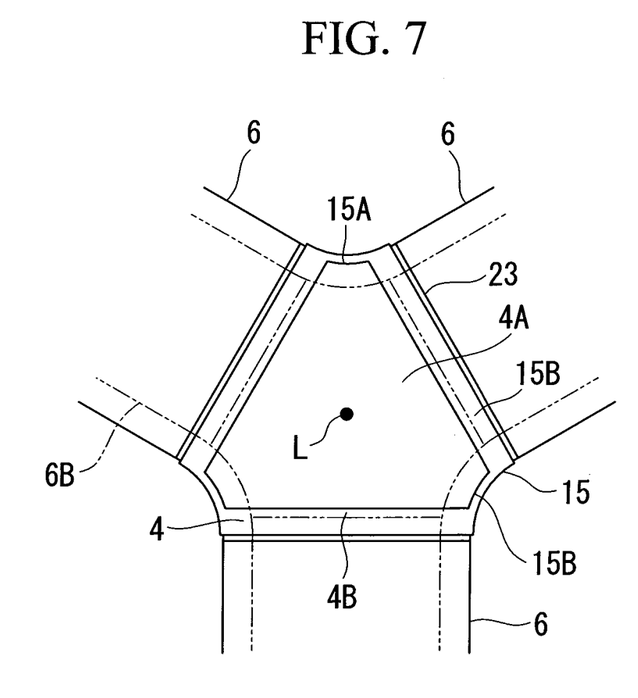
FIG. 7 is a schematic diagram for explaining the operation of the rotor head according to an embodiment of the present invention.

FIG. 7 shows the influence of the size of the saddle portions 15 on the size of the wind turbine blades 6. The saddle portions 15 have a size necessary for the molten metal to smoothly flow.

In this embodiment, because the size of the saddle portions 15 is independent of the cross-sectional area needed for the molten metal to flow, the wind-turbine-blade attaching portions 10A, 10B, and 10C can be moved toward the rotation axis L to reduce the size of the saddle portions 15, like a saddle portion 15A.

Thus, because the size of the saddle portions 15 can be reduced like the saddle portion 15A, the size of the rotor head 4 can be reduced like a rotor head 4A without changing the size of the wind turbine blades 6.

On the other hand, with respect to the integral rotor head 4, in the case of a rotor head 4B having substantially the same dimensions as the rotor head 4A, because a saddle portion 15B has substantially the same size as the saddle portions 15, wind turbine blades 6B are smaller than the wind turbine blades 6.

In other words, if wind turbine blades 6 of the same size are attached, the size of the rotor head 4 can be reduced in this embodiment.

Then, the cast joint surfaces 16 are filed down, and the reamer bores 18 for positioning are machined. Using the reamer bores 18 as a reference, the bolt holes 17, the attaching surfaces of the outer rings 27, etc. are machined.

Thus, because the machining of the cast metal, for example, the machining of the attaching surfaces of the slew rings, is performed according to the reamer bores 18 for determining positions when the front rotor head 13 and the rear rotor head 14 are joined, the rotor head 4 can be precisely formed by assembling the front rotor head 13 and the rear rotor head 14.

The separately formed front rotor head 13 and the rear rotor head 14 are transported to the erection site of the wind power generator 1. Thus, because the front rotor head 13 and the rear rotor head 14 are individually transported, the rotor head can be easily transported to the erection site even if it becomes large.

The front rotor head 13 and the rear rotor head 14 are assembled at the erection site. The reamer pins 19 are inserted into the reamer bores 18 in the joint portions 16 of one of the front rotor head 13 and the rear rotor head 14. The front rotor head 13 and the rear rotor head 14 are assembled such that the reamer pins 19 are inserted into the reamer bores 18 in the joint portion 16 of the other.

Then, the mated joint portions 16 are fastened using the bolts 20 and the nuts 22.

The outer rings 27 are attached to outer-ring attaching surfaces and the rotor head 4 is mounted on the main shaft 8 of the nacelle 3. Then, the wind turbine blades 6 are attached to the wind-turbine-blade attaching portions 10A, 10B, and 10C.

The present invention is not limited to the above-described embodiments, and it may be appropriately modified so long as it does not depart from the scope not departing from the gist of the present invention.

For example, although the rotor head 4 is divided into two segments in this embodiment, it may be divided into three or more segments. In such a case, one of the segmenting planes is set in a direction intersecting the rotation axis L, similarly to this embodiment.

The invention claimed is:

1. A rotor head of a wind power generator in which a plurality of wind turbine blades are radially attached around an axis, comprising:
   segments which are joined together; and
   openings which are formed between the segments to communicate with each other,
   wherein the plurality of wind turbine blades are fixed to the openings, and the segments are fastened at joint parts provided in saddle portions which are left between the openings so as to project in a plane intersecting the axis and outward and inward in a thickness direction.

2. The rotor head of a wind power generator according to claim 1,
   wherein the number of segments is two, and
   wherein the joint parts are formed in a plane passing through axial centers of the wind turbine blades.

3. The rotor head of a wind power generator according to claim 2,
   wherein the joint parts are provided with a positioning member that determines mutual joint positions.

4. The rotor head of a wind power generator according to claim 1,
   wherein the joint parts are provided with a positioning member that determines mutual joint positions.

5. A wind power generator comprising:
   a plurality of wind turbine blades that receive wind power in which said plurality of wind turbine blades are radially attached around an axis;
   a rotor head including segments which are joined together, and openings which are formed between the segments to communicate with each other, wherein the plurality of the wind turbine blades are fixed to the openings, and the segments are fastened at joint parts provided in saddle portions which are left between the openings so as to project outward and inward in a thickness direction in plane intersecting the axis; and
   a power generating unit that generates power by the rotation of the rotor head.

6. A wind power generator comprising:
   a plurality of wind turbine blades that receive wind power in which said plurality of wind turbine blades are radially attached around an axis;
   a rotor head including segments which are joined together, and openings which are formed between the segments to communicate with each other, wherein the plurality of the wind turbine blades are fixed to the openings, wherein the segments are fastened at joint parts provided in saddle portions which are left between the openings so as to project in plane intersecting the axis outward and inward in a thickness direction, wherein the number of segments is two, and wherein the joint parts are formed in a plane passing through axial centers of the wind turbine blades; and
   a power generating unit that generates power by the rotation of the rotor head.

7. A wind power generator comprising:
   a plurality of wind turbine blades that receive wind power in which said plurality of wind turbine blades are radially attached around an axis;
   a rotor head including segments which are joined together, and openings which are formed between the segments to communicate with each other, wherein the plurality of the wind turbine blades are fixed to the openings, wherein the segments are fastened at joint parts provided in saddle portions which are left between the openings so as to project in plane intersecting the axis and outward and inward in a thickness direction, wherein the number of segments is two, wherein the joint part are formed in a plane passing through axial centers of the wind turbine blades, and wherein the joint parts are provided with a positioning member that determines mutual joint positions; and
   a power generating unit that generates power by the rotation of the rotor head.

8. A wind power generator comprising:
   a plurality of wind turbine blades that receive wind power in which said plurality of wind turbine blades are radially attached around an axis;
   a rotor head including segments which are joined together, and openings which are formed between the segments to communicate with each other, wherein the plurality of wind turbine blades are fixed to the openings, wherein the segments are fastened at joint parts provided in saddle portions which are left between the openings so as to project in plane intersecting the axis and outward and inward in a thickness direction, and wherein the joint parts are provided with a positioning member that determines mutual joint positions; and
   a power generating unit that generates power by the rotation of the rotor head.

* * * * *